US012614106B2

(12) United States Patent
Selim et al.

(10) Patent No.: US 12,614,106 B2
(45) Date of Patent: Apr. 28, 2026

(54) MACHINE LEARNING TECHNIQUES USING CROSS-MODEL FINGERPRINTS FOR NOVEL PREDICTIVE TASKS

(71) Applicant: Optum Services (Ireland) Limited, Dublin (IE)

(72) Inventors: Ahmed Selim, Dublin (IE); Paul J. Godden, London (GB); Gregory J. Boss, Saginaw, MI (US); Erin A. Satterwhite, West Lakeland, MN (US); Nancy Joan Mendelsohn, Mendota Heights, MN (US); Melanie Majerus, Plymouth, MN (US)

(73) Assignee: Optum Services (Ireland) Limited, Dublin (IE)

( * ) Notice: Subject to any disclaimer, the term of this patent is extended or adjusted under 35 U.S.C. 154(b) by 1084 days.

(21) Appl. No.: 17/643,921

(22) Filed: Dec. 13, 2021

(65) Prior Publication Data

US 2023/0186151 A1     Jun. 15, 2023

(51) Int. Cl.
*G06N 20/00*        (2019.01)
*G06N 5/02*         (2023.01)

(52) U.S. Cl.
CPC .............. *G06N 20/00* (2019.01); *G06N 5/02* (2013.01)

(58) Field of Classification Search
CPC ................................. G06N 20/00; G06N 5/02
See application file for complete search history.

(56) References Cited

U.S. PATENT DOCUMENTS

| | | | |
|---|---|---|---|
| 5,839,438 A | 11/1998 | Graettinger et al. | |
| 2018/0301228 A1* | 10/2018 | Silva | G16H 50/70 |
| 2020/0074622 A1* | 3/2020 | Yang | G06V 40/193 |
| 2020/0167881 A1 | 5/2020 | Sheffer et al. | |
| 2020/0381083 A1 | 12/2020 | Chen | |
| 2020/0402660 A1* | 12/2020 | Chakravarthy | G16H 50/70 |
| 2021/0193320 A1 | 6/2021 | Shukla et al. | |
| 2021/0210195 A1* | 7/2021 | Dogdas | G06V 10/764 |
| 2021/0264261 A1* | 8/2021 | Staudinger | G06V 10/454 |
| 2021/0312615 A1* | 10/2021 | Yu | G06T 7/0012 |
| 2022/0335303 A1* | 10/2022 | Haidar | G06N 3/088 |
| 2023/0306267 A1* | 9/2023 | Jacob Banville | G06N 3/0442 |

FOREIGN PATENT DOCUMENTS

| | | | | |
|---|---|---|---|---|
| WO | WO2001026026 A2 * | 10/2000 | | G16H 15/00 |
| WO | 2020/006495 A1 | 1/2020 | | |

OTHER PUBLICATIONS

Wang, et al. "Generalizing from a few examples: A survey on few-shot learning." (Year: 2020).*

(Continued)

*Primary Examiner* — Ryan Barrett
*Assistant Examiner* — Matiyas T Maru
(74) *Attorney, Agent, or Firm* — Alston & Bird LLP

(57)                ABSTRACT

Various embodiments of the present invention provide methods, apparatus, systems, computing devices, computing entities, and/or the like for performing predictive data analysis. Certain embodiments of the present invention utilize systems, methods, and computer program products that perform predictive data analysis by using affirmative fingerprint distance measures and negative fingerprint distance measures.

20 Claims, 6 Drawing Sheets

(56) References Cited

OTHER PUBLICATIONS

Dvornik et al., "Selecting relevant features from a multi-domain representation for few-shot classification." (Year: 2020).*

Spann, et al. "Applying machine learning in liver disease and transplantation: a comprehensive review." (Year: 2020).*

"Rare Disease Impact Report: Insights From Patients and The Medical Community," Shire, Apr. 2013, (32 pages), Available online: https://globalgenes.org/wp-content/uploads/2013/04/ShireReport-1.pdf.

Cam, Yann Le et al. "How AI May Hold The Key To Faster Rare Disease Diagnosis," MedCity News, May 11, 2021, (6 pages), [Retrieved from the Internet Apr. 9, 2022] <URL: https://medcitynews.com/2021/05/how-ai-may-hold-the-key-to-faster-rare-disease-diagnosis/>.

Costalas, Steve. "Diagnosing Rare Diseases With AI and Machine Learning," Physicians Practice, Feb. 28, 2020, (2 pages), (article), Available online: https://www.physicianspractice.com/view/diagnosing-rare-diseases-ai-and-machine-learning>.

Garg, Ravi et al. A Bootstrap Machine Learning Approach To Identify Rare Disease Patients From Electronic Health Records, arXiv Preprint arXiv:1609.01586, Sep. 6, 2016, (8 pages).

Schaefer, Julia et al. "The Use of Machine Learning In Rare Diseases: A Scoping Review," Orphanet Journal of Rare Diseases, vol. 15, No. 145, Jun. 9, 2020, pp. 1-10, DOI: 10.1186/s13023-020-01424-6.

Stafford, I.S et al. "A Systematic Review of the Applications of Artificial Intelligence and Machine Learning In Autoimmune Diseases," Nature Partner Journals|Digital Medicine, vol. 3, No. 30, Mar. 9, 2020, pp. 1-11, DOI: 10.1038/s41746-020-0229-3.

Wakap, Stephanie Nguengang et al. "Estimating Cumulative Point Prevalence Of Rare Diseases: Analysis Of The Orphanet Database," European Journal of Human Genetics, vol. 28, No. 2, Feb. 2020, (Published Online: Sep. 16, 2019), pp. 165-173, DOI: 10.1038/s41431-019-0508-0.

* cited by examiner

External Computing Entities 102

Predictive Data Analysis Computing Entity 106

Storage Subsystem 108

Predictive Data Analysis System 101

Generate a plurality of per-model inferred representations
401

Determine a cross-model inferred representation
402

Generate a predictive output
403

Perform prediction-based actions
404

MACHINE LEARNING TECHNIQUES USING CROSS-MODEL FINGERPRINTS FOR NOVEL PREDICTIVE TASKS

BACKGROUND

Various embodiments of the present invention address technical challenges related to performing health-related predictive data analysis. Various embodiments of the present invention address the shortcomings of existing predictive data analysis systems and disclose various techniques for efficiently and reliably performing predictive data analysis.

BRIEF SUMMARY

In general, embodiments of the present invention provide methods, apparatus, systems, computing devices, computing entities, and/or the like for performing health-related predictive data analysis. Certain embodiments of the present invention utilize systems, methods, and computer program products that perform predictive data analysis by using affirmative fingerprint distance measures and negative fingerprint distance measures.

In accordance with one aspect, a method is provided. In one embodiment, the method comprises: for each existing task prediction machine learning model, processing the predictive input using the existing task prediction machine learning model to generate a per-model inferred representation for the predictive input; determining a cross-model inferred representation for the predictive input based at least in part on each per-model inferred representation; determining, based at least in part on the cross-model inferred representation and an affirmative cross-model fingerprint for the novel predictive task, an affirmative fingerprint distance measure for the predictive input, wherein the affirmative fingerprint distance measure is determined by: (i) for each affirmative-labeled predictive input of one or more affirmative-labeled predictive inputs associated with the novel predictive task, processing the affirmative-labeled predictive input using a plurality of existing task prediction machine learning models to generate a plurality of affirmative-labeled per-model inferred representations for the affirmative-labeled predictive input, and (ii) determining the affirmative fingerprint distance measure based at least in part on each plurality of affirmative-labeled per-model inferred representations; determine the predictive output based at least in part on the affirmative fingerprint distance measure; and performing one or more prediction-based actions based at least in part on the predictive output.

In accordance with another aspect, a computer program product is provided. The computer program product may comprise at least one computer-readable storage medium having computer-readable program code portions stored therein, the computer-readable program code portions comprising executable portions configured to: for each existing task prediction machine learning model, process the predictive input using the existing task prediction machine learning model to generate a per-model inferred representation for the predictive input; determine a cross-model inferred representation for the predictive input based at least in part on each per-model inferred representation; determine, based at least in part on the cross-model inferred representation and an affirmative cross-model fingerprint for the novel predictive task, an affirmative fingerprint distance measure for the predictive input, wherein the affirmative fingerprint distance measure is determined by: (i) for each affirmative-labeled predictive input of one or more affirmative-labeled predictive inputs associated with the novel predictive task, processing the affirmative-labeled predictive input using a plurality of existing task prediction machine learning models to generate a plurality of affirmative-labeled per-model inferred representations for the affirmative-labeled predictive input, and (ii) determining the affirmative fingerprint distance measure based at least in part on each plurality of affirmative-labeled per-model inferred representations; determine the predictive output based at least in part on the affirmative fingerprint distance measure; and perform one or more prediction-based actions based at least in part on the predictive output.

In accordance with yet another aspect, an apparatus comprising at least one processor and at least one memory including computer program code is provided. In one embodiment, the at least one memory and the computer program code may be configured to, with the processor, cause the apparatus to: for each existing task prediction machine learning model, process the predictive input using the existing task prediction machine learning model to generate a per-model inferred representation for the predictive input; determine a cross-model inferred representation for the predictive input based at least in part on each per-model inferred representation; determine, based at least in part on the cross-model inferred representation and an affirmative cross-model fingerprint for the novel predictive task, an affirmative fingerprint distance measure for the predictive input, wherein the affirmative fingerprint distance measure is determined by: (i) for each affirmative-labeled predictive input of one or more affirmative-labeled predictive inputs associated with the novel predictive task, processing the affirmative-labeled predictive input using a plurality of existing task prediction machine learning models to generate a plurality of affirmative-labeled per-model inferred representations for the affirmative-labeled predictive input, and (ii) determining the affirmative fingerprint distance measure based at least in part on each plurality of affirmative-labeled per-model inferred representations; determine the predictive output based at least in part on the affirmative fingerprint distance measure; and perform one or more prediction-based actions based at least in part on the predictive output.

BRIEF DESCRIPTION OF THE DRAWINGS

Figure 1:

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
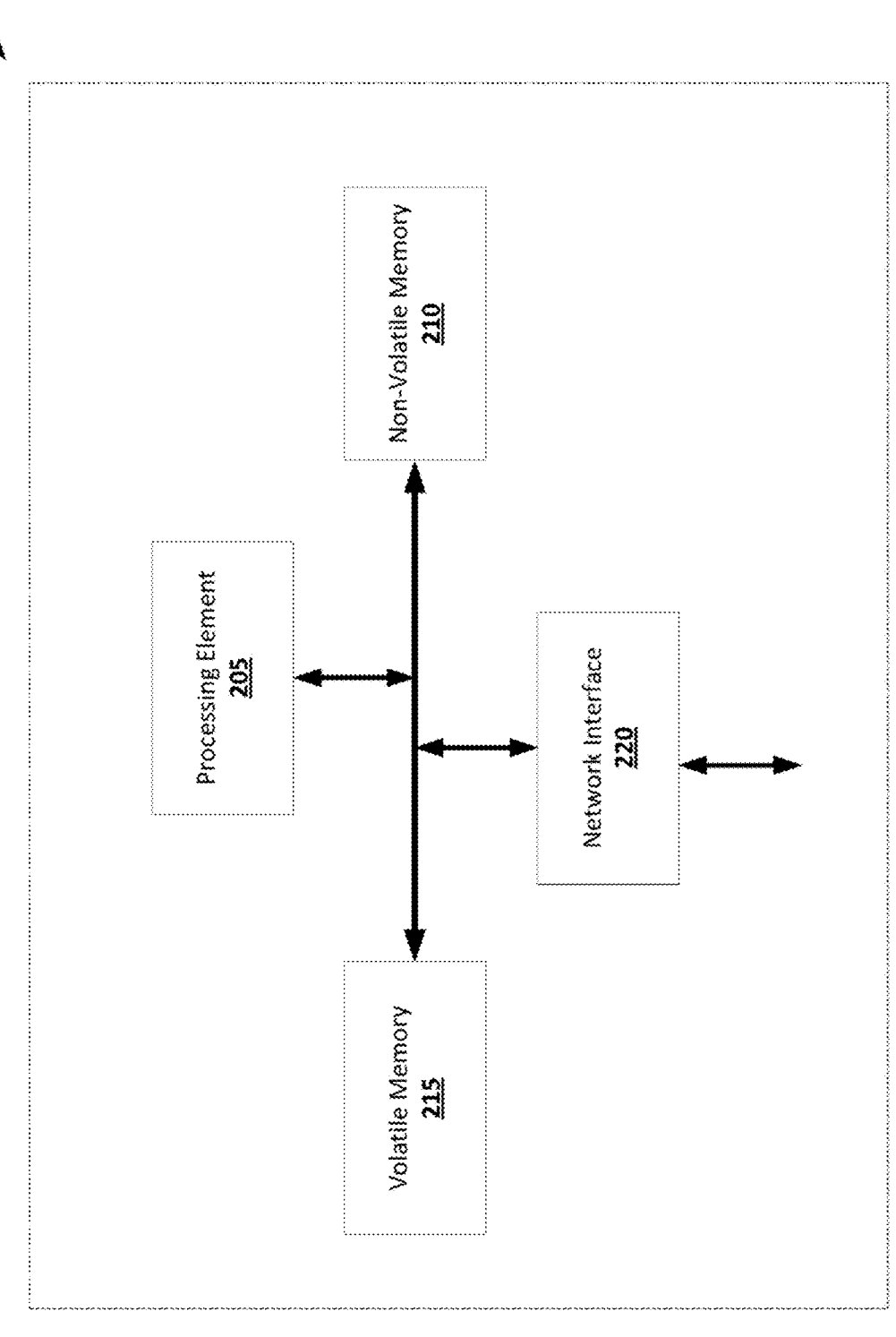

FIG. 2 provides an example predictive data analysis computing entity in accordance with some embodiments discussed herein.

Figure 3:
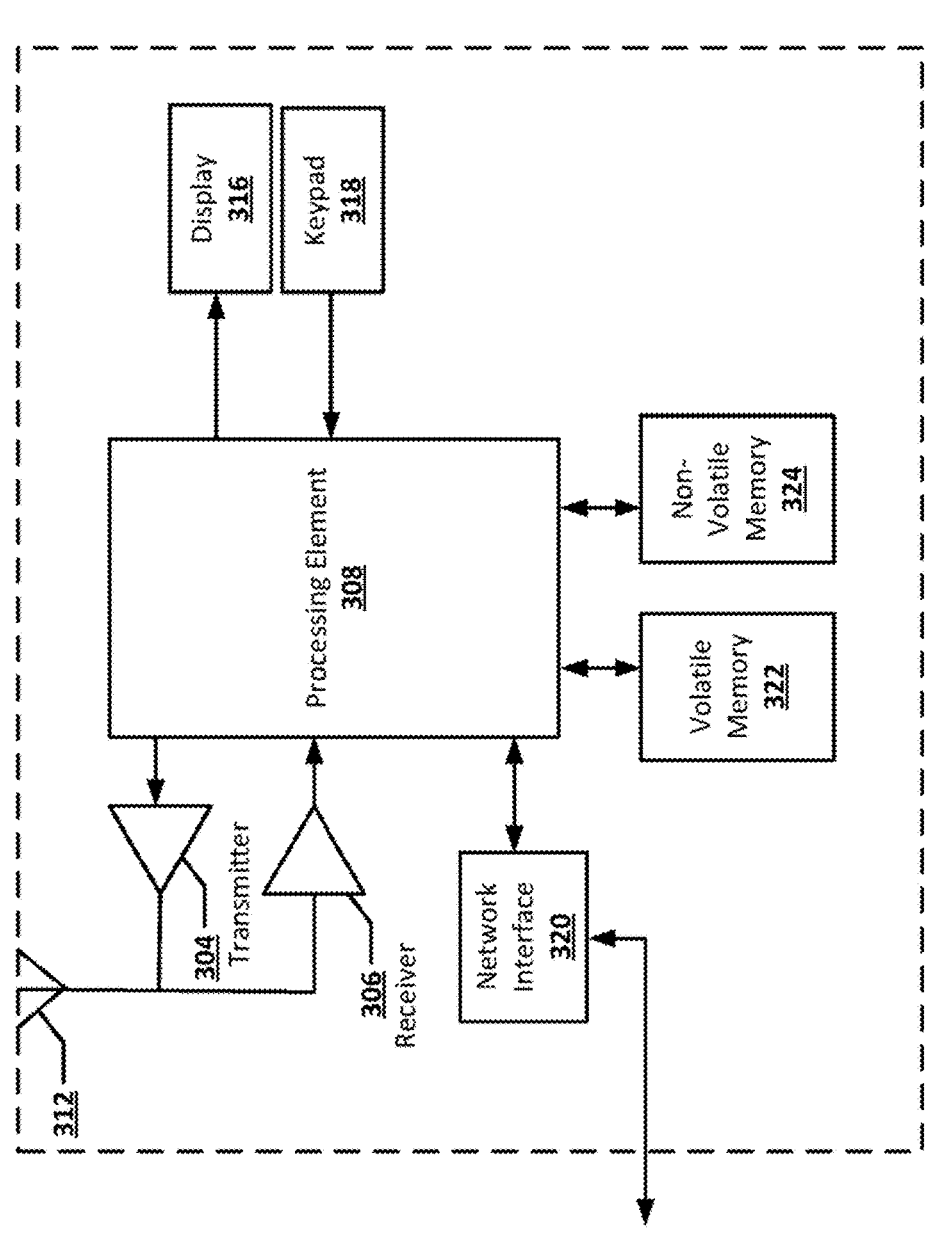

FIG. 3 provides an example external computing entity in accordance with some embodiments discussed herein.

Figure 4:

FIG. 4 is a flowchart diagram of an example process for generating a predictive output based at least in part on a cross-model inferred representation of a predictive input in accordance with some embodiments discussed herein.

Figure 5:
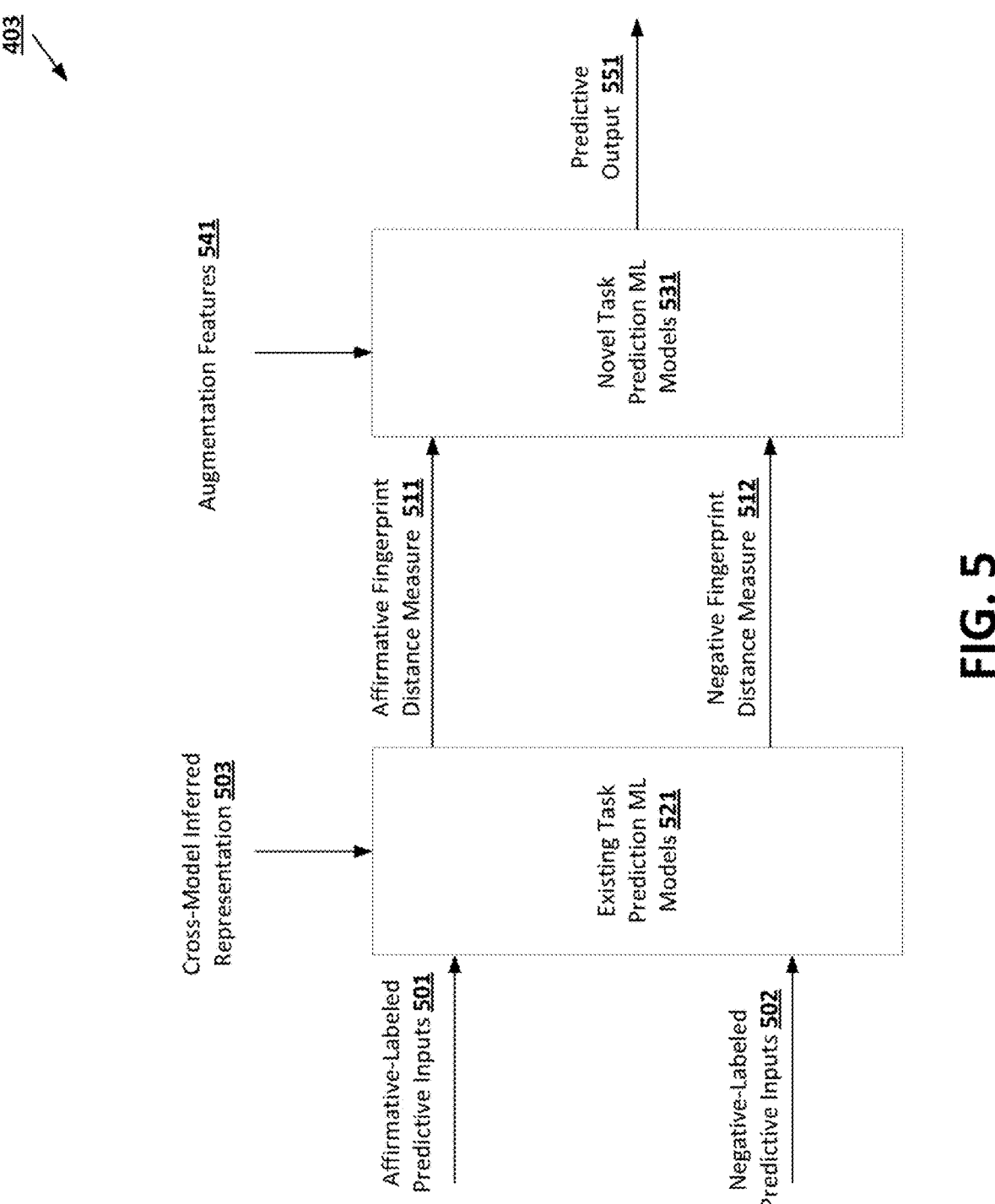

FIG. 5 is a data flow diagram of an example process for generating a predictive output based at least in part on an affirmative fingerprint distance measure and a negative fingerprint distance measure in accordance with some embodiments discussed herein.

Figure 6:
Figure 6:

FIG. 6 provides an operational example of a predictive output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention utilize existing machine learning models trained on existing predictive tasks to perform predictions with respect to novel predictive tasks. By doing so, various embodiments of the present invention enable techniques for performing novel predictive tasks, which in turn increases the operational throughput of predictive data analysis computing entities by decreasing the number of unsuccessful predictive tasks performed by the noted predictive data analysis computing entities. Moreover, by using the predictive knowledge embedded in trained existing machine learning models, various embodiments of the present invention reduce the amount of training iterations/data needed to train machine learning frameworks configured to perform predictions related to novel predictive tasks, thus decreasing computational load on predictive data analysis computing entities that are configured to perform predictions related to novel predictive tasks, and increasing computational efficiency and operational reliability of predictive data analysis computing entities. Through these ways, various embodiments of the present invention make important technical contributions to the field of predictive data analysis computing entities.

Various embodiments of the present invention use ML (ML) models trained on common traits/diseases to create "fingerprints" for rare disease data, and then use these "fingerprints" to identify individuals that may have a rare disease. The ML models may be trained to recognize the fingerprint of specific rare diseases as well as the common traits of a group of rare diseases. In some embodiments, a set of common disease prediction ML models are first generated. A system may use available data for common diseases and/or traits to generate risk score (e.g., a polygenic risk score (PRS)) using a ML method. In some embodiments, given N diseases/traits (N≥1), the output of the first stage will be one or more trained ML models, generating N risk scores for the N diseases. When individual's data is passed to these models, N scores may be generated and the $i$'th score represents the risk (or the likelihood) of a given individual being diagnosed with the $i$'th common disease/trait (1≤i≤N).

In some embodiments, rare disease fingerprints may be generated. This step/operation may be configured to use models trained in the first stage to produce fingerprints for the rare disease of interest by passing data available for the rare disease members though these models and generating scores for the rare disease members and/or internal activations inside the models. These generated scores and/or activations may then be considered as "fingerprints" or "signatures" that may help in identifying rare disease suspects in the future. The generated scores or activations can be used to extract "fingerprints" or "signatures" that may in turn be used to detect rare disease suspects.

In some embodiments, data for a case group comprising members diagnosed with a rare disease of interest and data for a control group comprising members not diagnosed with the rare disease of interest are provided to the set of trained common disease models to generate, for each member, a set of likelihood scores. Then, patterns across likelihood scores of case group members and control group members are combined to generate rare disease signatures, as well as signatures for families of rare diseases. The signatures can then be combined with demographic information to generate a rare disease prediction ML model for a rare disease of interest. The rare disease prediction model can then be used to generate a risk score for an individual that represents the likelihood of being diagnosed with the rare disease of interest.

II. Definitions

The term "existing task prediction machine learning model" may refer to a data construct that describe parameters, hyper-parameters, and/or defined operations of a machine learning model that is configured to generate predictive outputs that correspond to an existing predictive task that is associated with the existing task prediction machine learning model. An example of an existing predictive task is a disease detection predictive task, such as generating probability scores that describe inferred probabilities that particular patient identifiers associated with particular predictive inputs suffer from a particular disease (e.g., a particular common disease). For example, in some embodiments, a particular existing task prediction machine learning model may be configured to process input feature data associated with a patient identifier to generate a probability score that describes an inferred likelihood that the patient identifier is suffering from a common disease that is associated with the particular existing task prediction machine learning model. In some embodiments, one objective of various embodiments of the present invention is to use intermediate output values and/or final output values generated by machine learning models configured to generate predictions in relation to common diseases in order to generate predictions in relation to rare diseases. In some embodiments, the input of an existing machine learning model is a vector or a matrix describing feature data associated with a predictive input, while the output of the existing machine learning model is a vector describing a per-model inferred representation for the noted predictive input.

The term "per-model inferred representation" may refer to a data construct that describes one or more values generated by an existing task prediction machine learning model with respect to a predictive input. In some embodiments, to generate a per-model inferred representation for a predictive input, an existing task prediction machine learning model processes input feature data associated with the predictive input in order to generate a set of values, and then determines the per-model inferred representation based at least in part on at least some of the set of values. In some embodiments, the set of values used to generate per-model inferred representations comprise final model output values and intermediate model output values (e.g., activation/excitation values such as activation input values and activation output values, heat map values, and/or the like). For example, in some embodiments, when an existing task prediction machine learning model (e.g., a classification machine learning model) is configured to process input feature data for a predictive input in order to generate, as the output of the final layer of the existing task prediction machine learning model, a set of final output values (e.g., a set of final output values each describing a predicted likelihood that the predictive input is associated with a classification of a set of candidate classifications associated with the existing task prediction machine learning model), then the per-model inferred representation for the predictive input may be determined based at least in part on at least a subset of the described set of final output values that is generated via processing the input feature data for the predictive input using the existing task prediction machine learning model. As another example, when an existing task prediction machine learning model (e.g., a fully-connected machine learning model) comprises a set of machine learning nodes each associated with a machine learning layer of a set of machine learning layers, where each particular machine learning node in an nth machine learning layer is configured to process at least some of the activation output values generated by the machine learning nodes in the (n−1)th machine learning layer based at least in part on trained parameters (e.g., weights and/or biases) of the particular machine learning node in order to generate an activation input value for the particular machine learning node and then process the activation input value using an activation function (e.g., a sigmoid activation function) in order to generate an activation output value for the particular machine learning node, then the per-model inferred representation for a predictive input may be determined based at least in part on at least one of: (i) at least some of the activation input values generated by the set of machine learning nodes during an inference of the existing machine learning model that is performed via processing the input feature data associated with the predictive input, or (ii) at least some of the activation output values generated by the set of machine learning nodes during an inference of the existing machine learning model that is performed via processing the input feature data associated with the predictive input.

The term "cross-model inferred representation" may refer to a data construct that describes a representation of a corresponding predictive input that is generated by combining (e.g., concatenating, summing, averaging, and/or the like) each per-model inferred representation for the corresponding predictive input. In some embodiments, to generate the cross-model inferred representation for a corresponding predictive input, defined features are extracted from a set of per-model inferred representations for the corresponding predictive input, and the defined features are then organized into a structure (e.g., a vector) that is associated with the cross-model inferred representation. In some embodiments, to generate the cross-model inferred representation for a corresponding predictive input, a set of per-model inferred representations for the corresponding predictive input are processed by an embedding machine learning model to generate the cross-model inferred representation for the corresponding predictive input.

The term "affirmative-labeled predictive input" may refer to a data construct that describes a predictive input (e.g., a data construct describing one or more features for one or more existing machine learning models) associated with an affirmative ground-truth label with respect to the novel predictive task. For example, if the novel predictive task comprises rare disease prediction, then an affirmative-labeled predictive input may comprise predictive input data for an individual that is associated with a ground-truth label describing that the individual suffers from the rare disease. As another example, if the novel predictive task comprises rare object detection in images, then an affirmative-labeled predictive input may comprise predictive input data for an image that is associated with a ground-truth label describing that the image includes the rare object.

The term "negative cross-model fingerprint" may refer to a data construct that describes is a predictive input associated with a negative ground-truth label with respect to the novel predictive task. For example, if the novel predictive task comprises rare disease prediction, then a negative-labeled predictive input may comprise predictive input data for an individual that is associated with a ground-truth label describing that the individual does not suffer from the rare disease. As another example, if the novel predictive task comprises rare object detection in images, then a negative-labeled predictive input may comprise predictive input data for an image that is associated with a ground-truth label describing that the image does not include the rare object.

The term "affirmative cross-model fingerprint" may refer to a data construct that describes a representation of a set of affirmative-labeled predictive inputs for a novel predictive task that is determined based at least in part on each cross-model inferred representation for the set of affirmative-labeled predictive inputs. For example, in some embodiments, given s cross-model inferred representations for s affirmative-labeled predictive inputs, the resulting affirmative cross-model fingerprint may be determined by combining (e.g., concatenating, summing, averaging, and/or the like) the s cross-model inferred representations. As another example, in some embodiments, given s cross-model inferred representations for s affirmative-labeled predictive inputs, the resulting affirmative cross-model fingerprint may be determined based at least in part on the output of a cross-model inferred representation combination machine learning model that is configured to process the s cross-model inferred representations to generate the affirmative cross-model fingerprint for the corresponding novel predictive task.

The term "affirmative fingerprint distance measure" may refer to a data construct that describes a distance measure for a cross-model inferred representation of a corresponding predictive input and an affirmative cross-model fingerprint of a corresponding novel predictive task. In some embodiments, to generate the affirmative fingerprint distance measure for a predictive input in relation to a novel predictive task, a distance measure (e.g., a Euclidean distance measure) is calculated between a vector representation of the cross-model inferred representation of the corresponding predictive input and a vector representation of the affirmative cross-model fingerprint of the corresponding novel predictive task. In some embodiments, the affirmative fingerprint distance measure for a predictive input in relation to a novel predictive task is determined based at least in part on the output of processing feature data associated with the cross-model inferred representation of the corresponding predictive input and feature data associated with the affirmative cross-model fingerprint of the corresponding novel predictive task using a distance calculation machine learning model.

The term "negative cross-model fingerprint" may refer to a data construct that describes a representation of a set of negative-labeled predictive inputs for a novel predictive task that is determined based at least in part on each cross-model inferred representation for the set of negative-labeled predictive inputs. For example, in some embodiments, given s cross-model inferred representations for s negative-labeled predictive inputs, the resulting negative cross-model fingerprint may be determined by combining (e.g., concatenating, summing, averaging, and/or the like) the s cross-model inferred representations. As another example, in some embodiments, given s cross-model inferred representations for s negative-labeled predictive inputs, the resulting negative cross-model fingerprint may be determined based at least in part on the output of a cross-model inferred representation combination machine learning model that is configured to process the s cross-model inferred representations to generate the negative cross-model fingerprint for the corresponding novel predictive task.

The term "negative fingerprint distance measure" may refer to a data construct that describes a distance measure for a cross-model inferred representation of a corresponding predictive input and a negative cross-model fingerprint of a corresponding novel predictive task. In some embodiments, to generate the negative fingerprint distance measure for a predictive input in relation to a novel predictive task, a distance measure (e.g., a Euclidean distance measure) is calculated between a vector representation of the cross-model inferred representation of the corresponding predictive input and a vector representation of the negative cross-model fingerprint of the corresponding novel predictive task. In some embodiments, the negative fingerprint distance measure for a predictive input in relation to a novel predictive task is determined based at least in part on the output of processing feature data associated with the cross-model inferred representation of the corresponding predictive input and feature data associated with the negative cross-model fingerprint of the corresponding novel predictive task using a distance calculation machine learning model.

The term "novel task prediction machine learning model" may refer to a data construct that describe parameters, hyper-parameters, and/or defined operations of a machine learning model that is configured to process the affirmative fingerprint distance measure for a predictive input and/or the negative fingerprint distance measure for the predictive input in order to generate the predictive output for the predictive input. Because the inputs of the novel task prediction machine learning model include the affirmative fingerprint distance measure for a predictive input and the negative fingerprint distance measure for the predictive input, the novel task prediction machine learning model may be configured to learn how to make predictions in relation to a novel predictive task based at least in part on inferences made in accordance with the outputs of other machine learning models not designed to make predictions in relation to the novel predictive task, including outputs for affirmative-labeled predictive inputs associated with the novel predictive task and negative-labeled predictive inputs associated with the novel predictive task. In some embodiments, inputs to a novel task prediction machine learning model include one or more vectors describing the affirmative fingerprint distance measure for a predictive input and/or the negative fingerprint distance measure for the predictive input, while the output of a novel task prediction machine learning model include one or more vectors describing the predictive output.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing health-related predictive data analysis. The architecture 100 includes a predictive data analysis system 101 configured to receive health-related predictive data analysis requests from external computing entities 102, process the predictive data analysis requests to generate health-related risk predictions, provide the generated health-related risk predictions to the external computing entities 102, and automatically perform prediction-based actions based at least in part on the generated polygenic risk score predictions. Examples of health-related predictions include genetic risk predictions, polygenic risk predictions, medical risk predictions, clinical risk predictions, behavioral risk predictions, and/or the like.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive health-related predictive data analysis requests from one or more external computing entities 102, process the predictive data analysis requests to generate the polygenic risk score predictions corresponding to the predictive data analysis requests, provide the generated polygenic risk score predictions to the external computing entities 102, and automatically perform prediction-based actions based at least in part on the generated polygenic risk score predictions.

The storage subsystem 108 may be configured to store input data used by the predictive data analysis computing entity 106 to perform health-related predictive data analysis as well as model definition data used by the predictive data analysis computing entity 106 to perform various health-related predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FIG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention utilize existing machine learning models trained on existing predictive tasks (e.g., common disease prediction tasks) to perform predictions with respect to novel predictive tasks (e.g., rare disease prediction tasks). By doing so, various embodiments of the present invention enable techniques for performing novel predictive tasks, which in turn increases the operational throughput of predictive data analysis computing entities by decreasing the number of unsuccessful predictive tasks performed by the noted predictive data analysis computing entities. Moreover, by using the predictive knowledge embedded in trained existing machine learning models, various embodiments of the present invention reduce the amount of training iterations/data needed to train machine learning frameworks configured to perform predictions related to novel predictive tasks, thus decreasing computational load on predictive data analysis computing entities that are configured to perform predictions related to novel predictive tasks, and increasing computational efficiency and operational reliability of predictive data analysis computing entities. Through these ways, various embodiments of the present invention make important technical contributions to the field of predictive data analysis computing entities.

FIG. 4 is a flowchart diagram of an example process 400 for determining a predictive output for a predictive input in relation to a novel predictive task. Via the various steps/operations of the process 400, the predictive data analysis computing entity 106 can use a plurality of existing task prediction machine learning models associated with a plurality of existing predictive tasks to generate a predictive output for a novel predictive task that is distinct from the plurality of existing predictive tasks.

The process 400 begins at step/operation 401 when the predictive data analysis computing entity 106 processes the predictive input using a plurality of existing task prediction machine learning models to generate a plurality of per-model inferred representations. In some embodiments, for each existing task prediction machine learning model of the plurality of existing task prediction machine learning models, the predictive data analysis computing entity 106 processes the predictive input using the existing task prediction machine learning model to generate a per-model inferred representation for the predictive input. In some embodiments, processing a predictive input using a machine learning model comprises: (i) extracting input feature data from the predictive input corresponding to an expected input structure of the input for the machine learning model, and (ii) processing the input feature data based at least in part on the trained parameters and defined operations of the machine learning model to generate a per-model predictive output for the predictive input and the particular machine learning model.

In some embodiments, an existing task prediction machine learning model is a machine learning model that is configured to generate predictive outputs that correspond to an existing predictive task that is associated with the existing task prediction machine learning model. An example of an existing predictive task is a disease detection predictive task, such as generating probability scores that describe inferred probabilities that particular patient identifiers associated with particular predictive inputs suffer from a particular disease (e.g., a particular common disease). For example, in some embodiments, a particular existing task prediction machine learning model may be configured to process input feature data associated with a patient identifier to generate a probability score that describes an inferred likelihood that the patient identifier is suffering from a common disease that is associated with the particular existing task prediction machine learning model. In some embodiments, one objective of various embodiments of the present invention is to use intermediate output values and/or final output values generated by machine learning models configured to generate predictions in relation to common diseases in order to generate predictions in relation to rare diseases.

In some embodiments, a per-model inferred representation comprises one or more values generated by an existing task prediction machine learning model with respect to a predictive input. In some embodiments, to generate a per-model inferred representation for a predictive input, an existing task prediction machine learning model processes input feature data associated with the predictive input in order to generate a set of values, and then determines the per-model inferred representation based at least in part on at least some of the set of values. In some embodiments, the set of values used to generate per-model inferred representations comprise one or more final model output values and one or more intermediate model output values (e.g., activation/excitation values such as activation input values and activation output values, heat map values, and/or the like).

For example, in some embodiments, when an existing task prediction machine learning model (e.g., a classification machine learning model) is configured to process input feature data for a predictive input in order to generate, as the output of the final layer of the existing task prediction machine learning model, a set of final output values (e.g., a set of final output values each describing a predicted likelihood that the predictive input is associated with a classification of a set of candidate classifications associated with the existing task prediction machine learning model), then the per-model inferred representation for the predictive input may be determined based at least in part on at least a subset of the described set of final output values that is generated via processing the input feature data for the predictive input using the existing task prediction machine learning model.

As another example, when an existing task prediction machine learning model (e.g., a feed forward machine learning model, such as fully-connected feed forward machine learning model) comprises a set of machine learning nodes each associated with a machine learning layer of a set of machine learning layers, where each particular machine learning node in an nth machine learning layer is configured to process at least some of the activation output values generated by the machine learning nodes in the (n−1)th machine learning layer based at least in part on trained parameters (e.g., weights and/or biases) of the particular machine learning node in order to generate an activation input value for the particular machine learning node and then process the activation input value using an activation function (e.g., a sigmoid activation function) in order to generate an activation output value for the particular machine learning node, then the per-model inferred representation for a predictive input may be determined based at least in part on at least one of: (i) at least some of the activation input values generated by the set of machine learning nodes during an inference of the existing machine learning model that is performed via processing the input feature data associated with the predictive input, or (ii) at least some of the activation output values generated by the set of machine learning nodes during an inference of the existing machine learning model that is performed via processing the input feature data associated with the predictive input.

As yet another example, when an existing task prediction machine learning model (e.g., a convolutional neural network machine learning model) comprises a set of one or more machine learning layers that are configured to generate one or more heat map representations of input feature data associated with a predictive input, then the per-model inferred representation for the predictive input may be determined based at least in part on at least one of the values associated with at least one of the noted heat map representations.

As a further example, when an existing task prediction machine learning model (e.g., a recurrent neural network machine learning model, such as a long short term memory machine learning model) operates using a sequence of timesteps, where during each timestep the existing task prediction machine learning model is configured to process a given hidden state vector (e.g., for the first timestep a default timestep vector and for every subsequent timestep an updated hidden state vector of a preceding timestep) and a segment of a predictive input that corresponds to the timestep to generate an updated hidden state vector, then the per-model inferred representation for the predictive input may be determined based at least in part on at least a subset of the set of updated hidden state vectors that are generated by the existing task prediction machine learning model during the set of timesteps.

As discussed above, in some embodiments, the per-model inferred representation for a particular existing task prediction machine learning model in relation a predictive input may be generated based at least in part on at least one: (i) one or more final output values generated by the particular existing task prediction machine learning model that is generated via processing feature data associated with the predictive input, and (ii) one or more intermediate output values generated by the particular existing task prediction machine learning model that is generated via processing feature data associated with the predictive input. In some embodiments, a set of defined (final and/or intermediate) output values generated by the particular existing task prediction machine learning model that is generated via processing feature data associated with the predictive input are provided to a cross-output embedding machine learning model that is configured to process the set of defined output values to generate the per-model inferred representation for the particular existing task prediction machine learning model in relation the predictive input.

At step/operation 402, the predictive data analysis computing entity 106 determines a cross-model inferred representation of the predictive input based at least in part on each per-model inferred representation that is generated at step/operation 401. A cross-model inferred representation may describe a representation of a corresponding predictive input that is generated by combining (e.g., concatenating, summing, averaging, and/or the like) each per-model inferred representation for the corresponding predictive input. In some embodiments, to generate the cross-model inferred representation for a corresponding predictive input, defined features are extracted from a set of per-model inferred representations for the corresponding predictive input, and the defined features are then organized into a structure (e.g., a vector) that is associated with the cross-model inferred representation. In some embodiments, to generate the cross-model inferred representation for a corresponding predictive input, a set of per-model inferred representations for the corresponding predictive input are processed by an embedding machine learning model to generate the cross-model inferred representation for the corresponding predictive input.

At step/operation 403, the predictive data analysis computing entity 106 generates the predictive output based at least in part on the cross-model inferred representation that is generated at step/operation 401. In some embodiments, to generate the predictive output, the predictive data analysis computing entity 106 first determines (i) an affirmative fingerprint distance measure as a distance measure for the cross-model inferred representation and an affirmative cross-model fingerprint for the novel predictive task, and (ii) a negative fingerprint distance measure as a distance measure for the cross-model inferred representation and a negative cross-model fingerprint for the novel predictive task, and then determines the predictive output based at least in part on the affirmative fingerprint distance measure and the negative fingerprint distance measure. In some embodiments, to generate the predictive output, the predictive data analysis computing entity 106 first determines an affirmative fingerprint distance measure as a distance measure for the cross-model inferred representation and an affirmative cross-model fingerprint for the novel predictive task, and then determines the predictive output based at least in part on the affirmative fingerprint distance measure. In some embodiments, to generate the predictive output, the predictive data analysis computing entity 106 first determines a negative fingerprint distance measure as a distance measure for the cross-model inferred representation and a negative cross-model fingerprint for the novel predictive task, and then determines the predictive output based at least in part on the negative fingerprint distance measure.

By generating predictive outputs in the manner described above, various embodiments of the present invention utilize existing machine learning models trained on existing predictive tasks to perform predictions with respect to novel predictive tasks. By doing so, various embodiments of the present invention enable techniques for performing novel predictive tasks, which in turn increases the operational throughput of predictive data analysis computing entities by decreasing the number of unsuccessful predictive tasks performed by the noted predictive data analysis computing entities. Moreover, by using the predictive knowledge embedded in trained existing machine learning models, various embodiments of the present invention reduce the amount of training iterations/data needed to train machine learning frameworks configured to perform predictions related to novel predictive tasks, thus decreasing computational load on predictive data analysis computing entities that are configured to perform predictions related to novel predictive tasks, and increasing computational efficiency and operational reliability of predictive data analysis computing entities. Through these ways, various embodiments of the present invention make important technical contributions to the field of predictive data analysis computing entities.

In some embodiments, step/operation 403 may be performed in accordance with the process that is depicted in FIG. 5. The process that is depicted in FIG. 5 begins when the predictive data analysis computing entity 106 identifies a set of affirmative-labeled predictive inputs 501, where each affirmative-labeled predictive input is a predictive input associated with an affirmative ground-truth label with respect to the novel predictive task. For example, if the novel predictive task comprises rare disease prediction, then an affirmative-labeled predictive input may comprise predictive input data for an individual that is associated with a ground-truth label describing that the individual suffers from the rare disease. As another example, if the novel predictive task comprises rare object detection in images, then an affirmative-labeled predictive input may comprise predictive input data for an image that is associated with a ground-truth label describing that the image includes the rare object.

The process that is depicted in FIG. 5 continues when the predictive data analysis computing entity 106 identifies a set of negative-labeled predictive inputs 502, where each negative-labeled predictive input is a predictive input associated with a negative ground-truth label with respect to the novel predictive task. For example, if the novel predictive task comprises rare disease prediction, then a negative-labeled predictive input may comprise predictive input data for an individual that is associated with a ground-truth label describing that the individual does not suffer from the rare disease. As another example, if the novel predictive task comprises rare object detection in images, then a negative-labeled predictive input may comprise predictive input data for an image that is associated with a ground-truth label describing that the image does not include the rare object.

The process that is depicted in FIG. 5 continues when the predictive data analysis computing entity 106 determines an affirmative fingerprint distance measure 511 based at least in part on the set of affirmative-labeled predictive inputs 501 and the cross-model inferred representation 503. In particular, the predictive data analysis computing entity 106 may perform the following operations: (i) for each affirmative-labeled predictive input: (a) processing the input feature data for the affirmative-labeled predictive input using the existing task prediction machine learning models 521 to generate a set of per-model inferred representations for the affirmative-labeled predictive input (where each existing task prediction machine learning model generates a separate per-model inferred representation for the particular affirmative-labeled predictive input via processing input feature data for the affirmative-labeled predictive input), and (b) generating a cross-model inferred representation for the affirmative-labeled predictive input by combining the set of per-model inferred representations for the affirmative-labeled predictive input, (ii) determining an affirmative cross-model fingerprint based at least in part on the set of cross-model inferred representations for the set of affirmative-labeled predictive inputs 501, and (iii) determining the affirmative fingerprint distance measure 511 based at least in part on a measure of distance between the cross-model inferred representation 503 and the affirmative cross-model fingerprint.

An affirmative cross-model fingerprint may describe a representation of a set of affirmative-labeled predictive inputs for a novel predictive task that is determined based at least in part on each cross-model inferred representation for the set of affirmative-labeled predictive inputs. For example, in some embodiments, given s cross-model inferred representations for s affirmative-labeled predictive inputs, the resulting affirmative cross-model fingerprint may be determined by combining (e.g., concatenating, summing, averaging, and/or the like) the s cross-model inferred representations. As another example, in some embodiments, given s cross-model inferred representations for s affirmative-labeled predictive inputs, the resulting affirmative cross-model fingerprint may be determined based at least in part on the output of a cross-model inferred representation combination machine learning model that is configured to process the s cross-model inferred representations to generate the affirmative cross-model fingerprint for the corresponding novel predictive task.

An affirmative fingerprint distance measure may describe a distance measure for a cross-model inferred representation of a corresponding predictive input and an affirmative cross-model fingerprint of a corresponding novel predictive task. In some embodiments, to generate the affirmative fingerprint distance measure for a predictive input in relation to a novel predictive task, a distance measure (e.g., a Euclidean distance measure) is calculated between a vector representation of the cross-model inferred representation of the corresponding predictive input and a vector representation of the affirmative cross-model fingerprint of the corresponding novel predictive task. In some embodiments, the affirmative fingerprint distance measure for a predictive input in relation to a novel predictive task is determined based at least in part on the output of processing feature data associated with the cross-model inferred representation of the corresponding predictive input and feature data associated with the affirmative cross-model fingerprint of the corresponding novel predictive task using a distance calculation machine learning model.

The process that is depicted in FIG. 5 continues when the predictive data analysis computing entity 106 determines a negative fingerprint distance measure 512 based at least in part on the set of negative-labeled predictive inputs 502 and the cross-model inferred representation 503. In particular, the predictive data analysis computing entity 106 may perform the following operations: (i) for each negative-labeled predictive input: (a) processing the input feature data for the negative-labeled predictive input using the existing task prediction machine learning models 521 to generate a set of per-model inferred representations for the negative-labeled predictive input (where each existing task prediction machine learning model generates a separate per-model inferred representation for the particular negative-labeled predictive input via processing input feature data for the negative-labeled predictive input), and (b) generating a cross-model inferred representation for the negative-labeled predictive input by combining the set of per-model inferred representations for the negative-labeled predictive input, (ii) determining a negative cross-model fingerprint based at least in part on the set of cross-model inferred representations for the set of negative-labeled predictive inputs 502, and (iii) determining the negative fingerprint distance measure 512 based at least in part on a measure of distance between the cross-model inferred representation 503 and the negative cross-model fingerprint.

A negative cross-model fingerprint may describe a representation of a set of negative-labeled predictive inputs for a novel predictive task that is determined based at least in part on each cross-model inferred representation for the set of negative-labeled predictive inputs. For example, in some embodiments, given s cross-model inferred representations for s negative-labeled predictive inputs, the resulting negative cross-model fingerprint may be determined by combining (e.g., concatenating, summing, averaging, and/or the like) the s cross-model inferred representations. As another example, in some embodiments, given s cross-model inferred representations for s negative-labeled predictive inputs, the resulting negative cross-model fingerprint may be determined based at least in part on the output of a cross-model inferred representation combination machine learning model that is configured to process the s cross-model inferred representations to generate the negative cross-model fingerprint for the corresponding novel predictive task.

A negative fingerprint distance measure may describe a distance measure for a cross-model inferred representation of a corresponding predictive input and a negative cross-model fingerprint of a corresponding novel predictive task. In some embodiments, to generate the negative fingerprint distance measure for a predictive input in relation to a novel predictive task, a distance measure (e.g., a Euclidean distance measure) is calculated between a vector representation of the cross-model inferred representation of the corresponding predictive input and a vector representation of the negative cross-model fingerprint of the corresponding novel predictive task. In some embodiments, the negative fingerprint distance measure for a predictive input in relation to a novel predictive task is determined based at least in part on the output of processing feature data associated with the cross-model inferred representation of the corresponding predictive input and feature data associated with the negative cross-model fingerprint of the corresponding novel predictive task using a distance calculation machine learning model.

The process that is depicted in FIG. 5 continues when a novel task prediction machine learning model 531 processes the affirmative fingerprint distance measure 511 and the negative fingerprint distance measure 512 optionally along with augmentation features 541 (e.g., demographic features) of the predictive input in order to generate the predictive output 551. The novel task prediction machine learning model may be configured to process the affirmative fingerprint distance measure for a predictive input and the negative fingerprint distance measure for the predictive input in order to generate the predictive output for the predictive input. Because the inputs of the novel task prediction machine learning model include the affirmative fingerprint distance measure for a predictive input and the negative fingerprint distance measure for the predictive input, the novel task prediction machine learning model may be configured to learn how to make predictions in relation to a novel predictive task based at least in part on inferences made in accordance with the outputs of other machine learning models not designed to make predictions in relation to the novel predictive task, including outputs for affirmative-labeled predictive inputs associated with the novel predictive task and negative-labeled predictive inputs associated with the novel predictive task.

Returning to FIG. 4, at step/operation 404, the predictive data analysis computing entity 106 performs one or more prediction-based actions based at least in part on the predictive output. Examples of prediction-based actions including displaying a user interface that displays health-related risk predictions (e.g., at least one of epistatic polygenic risk scores, epistatic interaction scores, and base polygenic risk scores) for a target individual with respect to a set of conditions. For example, as depicted in FIG. 6, the predictive output user interface 600 depicts the health-related risk prediction for a target individual with respect to four target conditions each identified by the International Statistical Classification of Diseases and Related Health Problems (ICD) code of the noted four target conditions.

Other examples of prediction-based actions include one or more optimized scheduling operations for medical appointments scheduled when health-related risk predictions indicate a need for scheduling medical appointment (e.g., a disease score described by the predictive output for a rare disease predictive task satisfies a disease score threshold). examples of optimized scheduling operations include automatically scheduling appointments and automatically generating/triggering appointment notifications. In some embodiments, performing optimized scheduling operations includes automated system load balancing operations and/or automated staff allocation management operations. For example, an optimized appointment prediction system may automatically and/or dynamically process a plurality of event data objects in order to generate optimized appointment predictions for a plurality of patients requiring appointments with one or more providers. As another example, the optimized appointment prediction system may account for patient and/or provider availability on particular days and at particular times. In another example, the optimized appointment prediction system may reassign patients on a schedule in response to receiving real-time information, such as an instance in which a provider is suddenly unavailable due to an emergency or unplanned event/occurrence. Additionally, in some embodiments, the optimized appointment prediction system may be used in conjunction with an Electronic Health Record (EHR) system that is accessible by patients and providers to recommend a particular provider and/or automatically schedule an appointment with a particular provider in response to a request initiated by a patient. In some embodiments, the optimized appointment prediction system may aggregate a plurality of requests (e.g., from patients and/or providers) and generate one or more schedules in response to determining that a threshold number of requests have been received.

In another example, performing optimized scheduling operations includes providing additional appointment information/data (e.g., travel information, medication information, provider information, patient information and/or the like). By way of example, the optimized appointment prediction system may automatically provide pre-generated travel directions for navigating to and returning from an appointment location based at least in part on expected travel patterns at an expected end-time of the appointment. In some embodiments, the pre-generated travel directions may be based at least in part on analysis of travel patterns associated with a plurality of patients that have had appointments with a particular provider and/or at a particular location within a predefined time period.

In some embodiments, performing the optimized scheduling operations includes performing system load balancing operations for a medical record keeping system. For example, upon detecting that a medical appointment takes x minutes, computing resources of a medical record keeping system may be reassigned to ensure that adequate resources are available in order to facilitate medical record keeping as well as retrieval of data during the medical visit. In some embodiments, performing the optimized scheduling operations includes may detect that an appointment ends at a particular time, and provide optimal driving directions for post-appointment trip given expected traffic conditions at the particular time.

As described above, various embodiments of the present invention utilize existing machine learning models trained on existing predictive tasks to perform predictions with respect to novel predictive tasks. By doing so, various embodiments of the present invention enable techniques for performing novel predictive tasks, which in turn increases the operational throughput of predictive data analysis computing entities by decreasing the number of unsuccessful predictive tasks performed by the noted predictive data analysis computing entities. Moreover, by using the predictive knowledge embedded in trained existing machine learning models, various embodiments of the present invention reduce the amount of training iterations/data needed to train machine learning frameworks configured to perform predictions related to novel predictive tasks, and increasing computational efficiency and operational reliability of predictive data analysis computing entities. Through these ways, various embodiments of the present invention make important technical contributions to the field of predictive data analysis computing entities.

Moreover, various embodiments of the present invention use ML (ML) models trained on common traits/diseases to create "fingerprints" for rare disease data, and then use these "fingerprints" to identify individuals that may have a rare disease. The ML models may be trained to recognize the fingerprint of specific rare diseases as well as the common traits of a group of rare diseases. In some embodiments, data for a case group comprising members diagnosed with a rare disease of interest and data for a control group comprising members not diagnosed with the rare disease of interest are provided to a set of trained common disease models to generate, for each member, a set of likelihood scores. Then, patterns across likelihood scores of case group members and control group members are combined to generate rare disease signatures, as well as signatures for families of rare diseases. The signatures can then be combined with demographic information to generate a rare disease prediction ML model for a rare disease of interest. The rare disease prediction model can then be used to generate a risk score for an individual that represents the likelihood of being diagnosed with the rare disease of interest.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

inputting, by one or more processors a predictive input to at least one first task prediction machine learning model trained to perform at least one first predictive task, to receive an affirmative fingerprint distance measure, wherein:

(i) the affirmative fingerprint distance measure is associated with a second predictive task for which the at least one first task prediction machine learning models is not trained, (ii) the second predictive task corresponds to a limited training dataset with less training data relative to one or more training datasets corresponding to the at least one first predictive task, and (iii) determining the affirmative fingerprint distance measure comprises:

generating, based at least in part on the predictive input and using the at least one first task prediction machine learning model, a plurality of per-model prediction scores for the predictive input, determining a first cross-model prediction score for the predictive input based at least in part on combining the plurality of per-model prediction scores, generating a plurality of affirmative-labeled per-model prediction scores corresponding to a set of affirmative-labeled predictive inputs by providing the set of affirmative-labeled predictive inputs as input to the at least one first task prediction machine learning model, wherein an affirmative-labeled predictive input of the set of affirmative-labeled predictive inputs comprises the predictive input associated with an affirmative ground-truth label with respect to the second predictive task, determining an affirmative cross-model fingerprint for the second predictive task based on the plurality of affirmative-labeled per-model prediction scores, and determining, based at least in part on a vector representation of the first cross-model prediction score and a vector representation of the affirmative cross-model fingerprint, an affirmative fingerprint distance measure for the predictive input; and inputting, by the one or more processors, the predictive input and the affirmative fingerprint distance measure to a second task prediction machine learning model configured to generate a predictive output indicating a likelihood of a rare disease.

2. The computer-implemented method of claim 1, wherein generating the predictive output further comprises:

determining, based at least in part on the first cross-model prediction score and a negative cross-model fingerprint for the second predictive task, a negative fingerprint distance measure for the predictive input, wherein the negative fingerprint distance measure is determined by:

(i) processing a plurality of negative-labeled predictive inputs corresponding to the second predictive task using the at least one first task prediction machine learning model to generate a plurality of negative-labeled per-model prediction scores corresponding to the plurality of negative-labeled predictive inputs, and (ii) determining the negative fingerprint distance measure based at least in part on the plurality of negative-labeled per-model prediction scores; and generating the predictive output based at least in part on the affirmative fingerprint distance measure and the negative fingerprint distance measure.

3. The computer-implemented method of claim 2, wherein generating the predictive output based at least in part on the affirmative fingerprint distance measure and the negative fingerprint distance measure further comprises:

generating, using the second task prediction machine learning model and based at least in part on the affirmative fingerprint distance measure and the negative fingerprint distance measure, the predictive output.

4. The computer-implemented method of claim 1, wherein an affirmative-labeled per-model prediction score of the plurality of affirmative-labeled per-model prediction scores for a particular first task prediction machine learning model is determined based at least in part a final output value generated by the particular first task prediction machine learning model via processing the predictive input.

5. The computer-implemented method of claim 1, wherein an affirmative-labeled per-model prediction score of the plurality of affirmative-labeled per-model prediction scores for a particular first task prediction machine learning model is determined based at least in part on an intermediate output value generated by the particular first task prediction machine learning model via processing the predictive input.

6. The computer-implemented method of claim 5, wherein the intermediate output value generated by the particular first task prediction machine learning model comprises an activation output value generated by the particular first task prediction machine learning model via processing the predictive input.

7. The computer-implemented method of claim 5, wherein the intermediate output value generated by the particular first task prediction machine learning model comprises a heat map value generated by the particular first task prediction machine learning model via processing the predictive input.

8. The computer-implemented method of claim 1, wherein the second predictive task comprises a rare disease detection predictive task associated with a rare disease identifier.

9. The computer-implemented method of claim 8, wherein a first task prediction machine learning model of the at least one first task prediction machine learning model comprises a disease detection predictive task associated with a disease identifier that is distinct from the rare disease identifier.

10. A system comprising:

one or more processors; and at least one memory storing processor-executable instructions that, when executed by the one or more processors, cause the one or more processors to:

input a predictive input to at least one first task prediction machine learning model trained to perform at least one first predictive task to receive an affirmative fingerprint distance measure, wherein:

(i) the affirmative fingerprint distance measure is associated with a second predictive task for which the at least one first task prediction machine learning model is not trained, (ii) the second predictive task corresponds to a limited training dataset with less training data relative to one or more training datasets corresponding to the at least one first predictive task, and (iii) determining the affirmative fingerprint distance measure comprises:

generating, based at least in part on the predictive input and using the at least one first task prediction machine learning model, a plurality of per-model prediction scores for the predictive input, determining a first cross-model prediction score for the predictive input based at least in part on the plurality of per-model prediction scores, generating a plurality of affirmative-labeled per-model prediction scores corresponding to a set of affirmative-labeled predictive inputs by providing the set of affirmative-labeled predictive inputs as input to the at least one first task prediction machine learning model, wherein an affirmative-labeled predictive input of the set of affirmative-labeled predictive inputs comprises a predictive input associated with an affirmative ground-truth label with respect to the second predictive task, determining an affirmative cross-model fingerprint for the second predictive task based on combining the plurality of affirmative-labeled per-model prediction scores, and determining, based at least in part on a vector representation of the first cross-model prediction score and a vector representation of the affirmative cross-model fingerprint, an affirmative fingerprint distance measure for the predictive input; and input the predictive input and the affirmative fingerprint distance measure to a second task prediction machine learning model configured to generate a predictive output indicating a likelihood of a rare disease.

11. The system of claim 10, wherein generating the predictive output further comprises:

determining, based at least in part on the first cross-model prediction score and a negative cross-model fingerprint for the second predictive task, a negative fingerprint distance measure for the predictive input, wherein the negative fingerprint distance measure is determined by:

(i) processing a plurality of negative-labeled predictive inputs corresponding to the second predictive task using the at least one first task prediction machine learning model to generate a plurality of negative-labeled per-model prediction scores corresponding to the plurality of negative-labeled predictive inputs, and (ii) determining the negative fingerprint distance measure based at least in part on the plurality of negative-labeled per-model prediction scores; and generating the predictive output based at least in part on the affirmative fingerprint distance measure and the negative fingerprint distance measure.

12. The system of claim 11, wherein determining the predictive output based at least in part on the affirmative fingerprint distance measure and the negative fingerprint distance measure further comprises:

generate, using the second task prediction machine learning model and based at least in part on the affirmative fingerprint distance measure and the negative fingerprint distance measure, the predictive output.

13. The system of claim 10, wherein an affirmative-labeled per-model prediction score of the plurality of affirmative-labeled per-model prediction scores for a particular first task prediction machine learning model is determined based at least in part on a final output value generated by the particular first task prediction machine learning model via processing the predictive input.

14. The system of claim 10, wherein an affirmative-labeled per-model prediction score of the plurality of affirmative-labeled per-model prediction scores for a particular first task prediction machine learning model is determined based at least in part on an intermediate output value generated by the particular first task prediction machine learning model via processing the predictive input.

15. The system of claim 14, wherein the intermediate output value generated by the particular first task prediction machine learning model comprises an activation output value generated by the particular first task prediction machine learning model via processing the predictive input.

16. The system of claim 14, wherein the intermediate output value generated by the particular first task prediction machine learning model comprises a heat map value generated by the particular first task prediction machine learning model via processing the predictive input.

17. The system of claim 10, wherein the second predictive task comprises a rare disease detection predictive task associated with a rare disease identifier.

18. One or more non-transitory computer-readable storage media including instructions that, when executed by one or more processors, cause the one or more processors to:

input a predictive input to at least one first task prediction machine learning model, trained to perform at least one first predictive task, to receive an affirmative fingerprint distance measure, wherein:

(i) the affirmative fingerprint distance measure is associated with a second predictive task for which the at least one first task prediction machine learning model is not trained, (ii) the second predictive task corresponds to a limited training dataset with less training data relative to one or more training datasets corresponding to the at least one first predictive task, and (iii) determining the affirmative fingerprint distance measure comprises:

generating, based at least in part on the predictive input and using the at least one first task prediction machine learning model, a plurality of per-model prediction scores for the predictive input, determining a first cross-model prediction score for the predictive input based at least in part on combining the plurality of per-model prediction scores, generating a plurality of affirmative-labeled per-model prediction scores corresponding to a set of affirmative-labeled predictive inputs by providing the set of affirmative-labeled predictive inputs as input to the at least one first task prediction machine learning model, wherein an affirmative-labeled predictive input of the set of affirmative-labeled predictive inputs comprises a predictive input associated with an affirmative ground-truth label with respect to the second predictive task, determining an affirmative cross-model fingerprint for the second predictive task based on the plurality of affirmative-labeled per-model prediction scores, and determining, based at least in part on a vector representation of the first cross-model prediction score and a vector representation of the affirmative cross-model fingerprint, an affirmative fingerprint distance measure for the predictive input; and input the predictive input and the affirmative fingerprint distance measure to a second task prediction machine learning model configured to generate a predictive output indicating a likelihood of a rare disease.

19. The computer-implemented method of claim 1, further comprising:

performing operational load balancing for a predictive data analysis system comprising one or more computing resources by reassigning the one or more computing resources based on the predictive output.

20. The system of claim 10, wherein the one or more processors are further caused to:

perform operational load balancing for a predictive data analysis system comprising one or more computing resources by reassigning the one or more computing resources based on the predictive output.

* * * * *